United States Patent
Perets et al.

(10) Patent No.: US 10,661,438 B2
(45) Date of Patent: May 26, 2020

(54) ROBOT APPARATUS, METHODS AND COMPUTER PRODUCTS

(71) Applicant: ANTS TECHNOLOGY (HK) LIMITED, Wanchai (HK)

(72) Inventors: Gal Perets, Mazkeret Batya (IL); Ilya Blayvas, Rehovot (IL); Ron Fridental, Shoham (IL); Pavel Nosko, Yavne (IL); Alex Rosen, Ramat Gan (IL); Ophir Gvirtzer, Rehovot (IL)

(73) Assignee: ANTS TECHNOLOGY (HK) LIMITED, Hong Kong (HK)

( * ) Notice: Subject to any disclaimer, the term of this patent is extended or adjusted under 35 U.S.C. 154(b) by 262 days.

(21) Appl. No.: 15/407,179

(22) Filed: Jan. 16, 2017

(65) Prior Publication Data

US 2018/0200884 A1    Jul. 19, 2018

(51) Int. Cl.
*G06F 19/00* (2018.01)
*B25J 9/16* (2006.01)
*G06N 3/00* (2006.01)
*G06N 3/08* (2006.01)

(52) U.S. Cl.
CPC .............. *B25J 9/163* (2013.01); *G06N 3/008* (2013.01); *G05B 2219/39162* (2013.01); *G05B 2219/39164* (2013.01); *G06N 3/08* (2013.01); *Y10S 901/03* (2013.01); *Y10S 901/08* (2013.01)

(58) Field of Classification Search
CPC ....... B25J 9/163; G06N 7/005; G06N 99/005; Y10S 901/03; Y10S 901/08
See application file for complete search history.

(56) References Cited

U.S. PATENT DOCUMENTS

| | | | | |
|---|---|---|---|---|
| 4,495,588 | A * | 1/1985 | Nio | B25J 9/161 318/568.2 |
| 6,546,321 | B1 * | 4/2003 | Ohkubo | F02D 41/2425 123/486 |
| 8,285,417 | B2 * | 10/2012 | Kawaguchi | B25J 9/1661 700/245 |
| 8,307,061 | B1 * | 11/2012 | Hickman | B25J 9/161 318/568.12 |

(Continued)

FOREIGN PATENT DOCUMENTS

JP     11110026 A * 4/1999

OTHER PUBLICATIONS

Kunze, et al., Towards Semantic Robot Description Languages, IEEE International Conference on Robotics and Automation, May 9-13, 2011, pp. 5589-5595.

(Continued)

*Primary Examiner* — Khoi H Tran
*Assistant Examiner* — Jorge O Peche
(74) *Attorney, Agent, or Firm* — Soroker Agmon Nordman (57) ABSTRACT

A robotic system ("new robot") operative for performing at least one task in an environment, the system comprising: learn-from-predecessor functionality governed by a data exchange protocol, which controls short-range wireless knowledge transfer from a short-range wireless transmitter in a predecessor robot system ("old robot") to a short-range wireless receiver in said robotic system, said knowledge comprising at least one environment-specific datum previously stored by the predecessor robot.

19 Claims, 3 Drawing Sheets

(56) References Cited

U.S. PATENT DOCUMENTS

| | | | | |
|---|---|---|---|---|
| 8,406,926 | B1* | 3/2013 | Lewis | G06Q 30/02 |
| | | | | 382/115 |
| 8,639,644 | B1* | 1/2014 | Hickman | G06N 3/008 |
| | | | | 700/245 |
| 8,718,822 | B1* | 5/2014 | Hickman | B25J 9/1674 |
| | | | | 700/214 |
| 9,026,248 | B1* | 5/2015 | Hickman | B25J 3/00 |
| | | | | 700/248 |
| 9,064,211 | B2* | 6/2015 | Visel | G06F 40/211 |
| 9,213,936 | B2* | 12/2015 | Visel | G06F 40/211 |
| 10,131,052 | B1* | 11/2018 | Ibarz Gabardos | G06N 3/049 |
| 10,341,374 | B1* | 7/2019 | Sadaghiani | G06K 9/6262 |
| 10,360,482 | B1* | 7/2019 | Khare | G06N 3/084 |
| 2004/0024490 | A1* | 2/2004 | McLurkin | G05D 1/0297 |
| | | | | 700/245 |
| 2006/0079997 | A1* | 4/2006 | McLurkin | G05D 1/0297 |
| | | | | 700/245 |
| 2007/0093940 | A1* | 4/2007 | Ng-Thow-Hing | B62D 57/028 |
| | | | | 700/245 |
| 2009/0082879 | A1* | 3/2009 | Dooley | B25J 9/1658 |
| | | | | 700/3 |
| 2009/0114140 | A1* | 5/2009 | Guerrero | B63C 11/52 |
| | | | | 114/321 |
| 2009/0132088 | A1* | 5/2009 | Taitler | G05B 19/42 |
| | | | | 700/264 |
| 2009/0187278 | A1* | 7/2009 | Zhuk | G05D 1/0088 |
| | | | | 700/246 |
| 2009/0306823 | A1* | 12/2009 | Baltes | G05D 1/0274 |
| | | | | 700/245 |
| 2013/0079928 | A1* | 3/2013 | Soe-Knudsen | B25J 9/009 |
| | | | | 700/248 |
| 2018/0197111 | A1* | 7/2018 | Crabtree | G06F 16/27 |
| 2019/0019109 | A1* | 1/2019 | Sadaghiani | G06N 5/045 |
| 2019/0197396 | A1* | 6/2019 | Rajkumar | G06N 3/08 |
| 2019/0212752 | A1* | 7/2019 | Fong | A47L 9/2857 |

OTHER PUBLICATIONS

Kuhn, Tobias, A Survey and Classification of Controlled Natural Languages, Computational Linguistics, 2014, pp. 121-170, vol. 40, No. 1.

Guizzo, Erico, Google Wants Robots to Acquire New Skills by Learning From Each Other, https://spectrum.ieee.org/automaton/robotics/artificial-intelligence/google-wants-robots-to-acquire-new-skills-by-learning-from-each-other, Oct. 5, 2016, pp. 1-3.

Robots Learn to Learn from Each Other, Not Just a Central Database, http://webcache.googleusercontent.com/search?q=cache:pZT3m5b0gUEJ:bigthink.com/ideafeed/robots-learn-to-learn-from-each-other-not-just-a-central-database+&cd=3&hl=en&ct=clnk&gl=il, Jun. 18, 2016, pp. 1-8.

Patterson, Steven Max, How robots will teach each other with data, http://webcache.googleusercontent.com/search?q=cache:G_SY4CgecHAJ:www.networkworld.com/article/3134331/hardware/how-robots-will-teach-eachother-with-data.html+&cd=5&hl=en&ct=clnk&gl=il, Oct. 25, 2016, pp. 1-7.

Irving, Michael, Google teaches robots to teach each other, http://webcache.googleusercontent.com/search?q=cache:n-NIMpFqTKFIJ:newatlas..com/google-research-cloud-robotics/45767/+&cd=6&hl=en&ct=clnk&gl=il, Oct. 4, 2016, pp. 1-8.

Glaser, April, These industrial robots teach each other new skills while we sleep, https://www.recode.net/2016/10/14/13274428/artificial-intelligence-ai-robots-auto-production-audi, Oct. 14, 2016, pp. 1-5.

Haasdijk, et al., Robots Learn From Each Other, http://webcache.googleusercontent.com/search?q=cache:vr3QOfsv-lkJ:www.focas.eu/idoc/robots-learn-from-each-other.html, Feb. 22, 2016, pp. 1-2.

Deighton, Ben, Robots to learn from each other through the cloud, https://webcache.googleusercontent.com/search?q=cache:xOIV5KfpjX4J:https://horizon-magazine.eu/article/robots-learn-each-other-through-cloud_en.html, Dec. 18, 2013, p. 1-3.

Mlot, Stephanie, Google Robots Are Learning From Each Other, https://www.pcmag.com/article2/0,2817,2500685,00.asp, Mar. 11, 2016, pp. 1-4.

* cited by examiner

ROBOT APPARATUS, METHODS AND COMPUTER PRODUCTS

REFERENCE TO CO-PENDING APPLICATIONS

No priority is claimed.

FIELD OF THIS DISCLOSURE

The present invention relates generally to computerized systems and more particularly to robots.

BACKGROUND FOR THIS DISCLOSURE

Robots which learn from each other, or teach each other, have been postulated.

State of the art robots, e.g. human support robots developed e.g. Human Support Robot (HSR) by Toyota, or, more specifically, target robots such as cleaning robots, learn maps, (say of a house included in their environment, including furniture, doors and obstacles) and update the maps if the house changes e.g. because the house has been remodeled, or because the family has moved to a new house.

Many short-range wireless communication technologies are known, such as but not limited to NFC, Bluetooth and Wi-Fi. Near-field communication (NFC) is intended to include any communication protocol that enables electronic devices to establish communication when within a few centimeters of one another.

The disclosures of all publications and patent documents mentioned in the specification, and of the publications and patent documents cited therein directly or indirectly, are hereby incorporated by reference. Materiality of such publications and patent documents to patentability is not conceded

SUMMARY OF CERTAIN EMBODIMENTS

Certain embodiments seek to provide a method for allowing robots serving a particular environment or location or task, to inherit knowledge regarding that environment or location or task from their predecessors.

According to certain embodiments, the old robot's entire memory may be copied (transferred to the new robot).

According to certain embodiments, one or more old robot memory cards may be physically transferred to the new robot.

The following terms may be construed either in accordance with any definition thereof appearing in the prior art literature or in accordance with the specification, or as follows:

Knowledge: content of a robot's memory e.g. Models, rules, data whether labelled or unlabeled, algorithms, etc. Including data stored in memory at the old robot or in a remote location e.g. cloud, in a data repository accessible by and associated with the old robot.

Labelled data: intended to include labels such as "mom's face" "dad's bed" "Jack's room" in respective association with images of mom's face, dad's bed and Jack's room and/or with other definitions of classes into which a new face, object or location encountered in the house may be classified.

Learning algorithm: intended to include parameters of a classifier trained to recognize faces or objects encountered in the environment e.g. house, or any algorithm, constructed e.g. by machine learning, that can learn from and make predictions on data e.g. data collected by a robot.

Model: e.g. trained software model or trained classifier, generated e.g. by machine learning. A model may include a computer program (say: neural network) which learns from experience E e.g. encountered by at least one robot, with respect to some class of tasks T e.g. defined for at least one robot because the program's performance at tasks in T, as measured by a and performance measure P, improves with experience E.

Object detector—may be trained to detect certain objects, persons, or patterns in a robot's input such as image, video stream, 3D stream or other sensory input;

Rules: such as "don't clean between 2 and 4 o'clock" or "clean Jack's room only on Sundays" e.g. in association with a map of the house in which "Jack's room" is labelled.

Speech Recognition Engine—is intended to include either or both of recognition of predefined voice commands, and/or natural language processing.

Unlabeled data: intended to include images of humans/faces/objects; sounds/voice samples/video/3d scans/any other sensory input.

Certain embodiments of the present invention seek to provide at least one processor in communication with at least one memory, with instructions stored in such memory executed by the processor to provide functionalities which are described herein in detail.

Thus the present invention typically includes at least the following embodiments:

Embodiment 1

An advanced robotic system ("new robot") including a computer-controlled actuator with sensors which is operative for performing at least one task in an environment, the system comprising: learn-from-predecessor functionality including a processor which, governed by a data exchange protocol, controls short-range wireless knowledge transfer from a short-range wireless transmitter in a predecessor robot system ("old robot") to a short-range wireless receiver in the robotic system, the knowledge comprising at least one environment-specific datum previously stored by the predecessor robot.

Embodiment 2

A system e.g. according to Embodiment 1 which is also operative for searching the environment for at least one robot still deployed in the environment, to serve as the predecessor robot.

Embodiment 3

A system e.g. according to any of the preceding embodiments wherein the task is performed differentially, in the presence of different humans.

Embodiment 4

A system e.g. according to any of the preceding embodiments wherein the datum learned from the predecessor robot comprises at least one spatial attribute of the environment's physical layout and wherein the task comprises cruising at least a predefined portion of the layout.

Embodiment 5

A system e.g. according to any of the preceding embodiments wherein the at least one environment-specific datum comprises at least one trained model.

Embodiment 6

A system e.g. according to any of the preceding embodiments wherein the at least one environment-specific datum comprises labeled data.

Embodiment 7

A system e.g. according to any of the preceding embodiments wherein the at least one environment-specific datum comprises at least one rule governing at least one robot task.

Embodiment 8

A system e.g. according to any of the preceding embodiments wherein the datum comprises an if-then rule programmed into the predecessor robot by a human or learned by the predecessor robot from its own predecessor or from its own experience in the environment.

Embodiment 9

A system e.g. according to any of the preceding embodiments wherein the if-then rule has the form: "if" (condition on detected location of recognized mobile entity—human/pet or on time or environment attribute e.g. temperature) then (definition of at least one task parameter such as perform task yes/no; time/temperature/duration of task).

Embodiment 10

A system e.g. according to any of the preceding embodiments wherein the datum learned from the predecessor robot comprises at least one face of at least one human who has, to date, frequented the environment.

Embodiment 11

A system e.g. according to any of the preceding embodiments wherein the learn-from-predecessor functionality is operative to transfer predetermined sensitive information only via a wired connection (such as a USB or Ethernet cable).

Embodiment 12

A system e.g. according to any of the preceding embodiments wherein the robots communicate using a direct Point-to-Point Protocol.

Embodiment 13

A system e.g. according to any of the preceding embodiments wherein the robots communicate via a WiFi router.

Embodiment 14

A system e.g. according to any of the preceding embodiments wherein the old robot sends its model number to the new robot upon request, and the new robot stores in computer memory a list of old robot models including at least one data item relevant to between-robot knowledge transfer, for each model on the list.

Embodiment 15

A system e.g. according to any of the preceding embodiments wherein the data item includes a learning mode which the new robot should select, when learning from the old robot.

Embodiment 16

A system e.g. according to any of the preceding embodiments wherein the new robot updates at least one of the old robot's firmware and the old robot's software, thereby to transfer knowledge to the old robot.

Embodiment 17

A system e.g. according to any of the preceding embodiments wherein said at least one datum comprises a labelled dataset of human family member images, for a human family residing in the environment.

Embodiment 18

A system e.g. according to any of the preceding embodiments wherein the system also includes teach-successor functionality governed by a data exchange protocol, known to the system and to a successor robot system, which controls short-range wireless knowledge transfer from a short-range wireless transmitter in the system to a short-range wireless receiver in the successor robot, the knowledge comprising at least one environment-specific datum stored in computer memory in the system.

Embodiment 19

A robotic method allowing a robot ("new robot") to perform at least one task in an environment, the method comprising providing learn-from-predecessor functionality including a processor which, governed by a data exchange protocol, which controls short-range wireless knowledge transfer from a short-range wireless transmitter in a predecessor robot system ("old robot") to a short-range wireless receiver in said robotic system, and using said functionality to transfer knowledge comprising at least one environment-specific datum previously stored by the predecessor robot, to the new robot.

Embodiment 21

A computer program product, comprising a non-transitory tangible computer readable medium having computer readable program code embodied therein, the computer readable program code adapted to be executed to implement a robotic method allowing a robot ("new robot") to perform at least one task in an environment, the method comprising providing learn-from-predecessor functionality including a processor which, governed by a data exchange protocol, which controls short-range wireless knowledge transfer from a short-range wireless transmitter in a predecessor robot system ("old robot") to a short-range wireless receiver in the robotic system, and using the functionality to transfer knowledge comprising at least one environment-specific datum previously stored by the predecessor robot, to the new robot.

Embodiment 23

A system e.g. according to any of the preceding embodiments wherein the protocol is known to the system and to a predecessor robot system ("old robot").

Embodiment 24

A system e.g. according to any of the preceding embodiments wherein said task comprises at least one of: cleaning the layout, searching the layout, and monitoring the layout for intruders.

Embodiment 25

A system e.g. according to any of the preceding embodiments wherein the datum comprises a location of at least one functional element.

Embodiment 26

A system e.g. according to any of the preceding embodiments wherein the datum comprises a tagged location associated with at least one human who has, to date, frequented the environment.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, and a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software, firmware, hardware or any combination thereof. Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case some or all of the variables, parameters, and computations described herein may be in hardware.

Any logical functionality described herein may be implemented as a real time application if and as appropriate and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

It is appreciated that the various functionalities, modules, subsystems described herein, may be firmware-implemented or processor-implemented.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include an apparatus which is primary, secondary, tertiary or off-line, which is of any type or level or amount or category of volatility, differentiation, mutability, accessibility, addressability, capacity, performance and energy use, and which is based on any suitable technologies such as semiconductor, magnetic, optical, paper and others.

DETAILED DESCRIPTION OF CERTAIN EMBODIMENTS

Certain embodiments include an advanced robotic system operative for performing at least one task in an environment, the system comprising: learn-from-predecessor functionality operative for searching the environment for a predecessor robot still deployed in the environment, and learning from the predecessor robot, if any, at least one environment-specific datum relevant to the at least one task and previously stored by the predecessor robot. Typically, the learn-from-predecessor functionality is operative to search either unconditionally or responsive to a manual input indicating that a previous robot exists. The learn-from-predecessor functionality may search (e.g. may cruise through the environment e.g. house) until either (a) the predecessor robot is encountered and recognized or (b) the entire house has been searched unsuccessfully or (c) timeout. If the learn-from-predecessor functionality is unsuccessful in finding any old robot (e.g. all attempts to establish WIFI/Bluetooth/IR/NFC connection to another robot fail), the new robot may simply learn conventionally.

Figure 1:
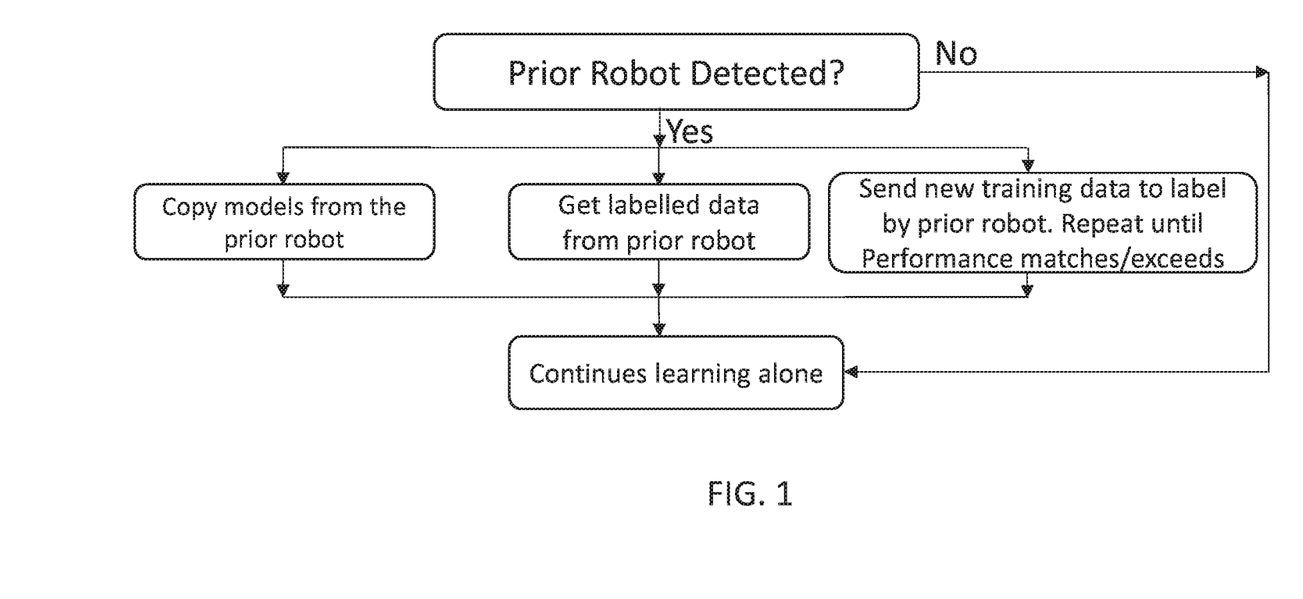
FIG. 1 is a simplified flowchart of a learning process typically performed by processor/s, allowing a robot to inherit knowledge from a predecessor (e.g. a robot which has previously operated in the same environment) in accordance with certain embodiments.

According to certain embodiments, the previous robot comprises a WIFI/Bluetooth/IR transceiver providing the old robot with ability to communicate with the new robot e.g., and a predefined exchange protocol known to both old and new robots. Typically, the protocol has plural selectable (e.g. system-selectable) operation modes e.g. some or all of the following four typically independently operating modes for each of the following four operations respectively:

Robot learning mode a: exporting (aka transferring or copying) already trained models including, say, trained Deep Learning Networks e.g. for object/person/pattern/detection/recognition from images/video, or for speech recognition;

and/or robot learning mode b: exporting, to the new robot, a repository of labelled data previously learnt by old robot (aka labeled training set)

and/or robot learning mode c—query sending: sending new training data provided to or collected by the new robot, as a query from new robot to prior robot, for labeling thereby. For example, after receiving new unlabeled data, the unlabeled data may be sent to the old robot which may be capable of recognizing the unlabeled data including determining a label thereof which identifies persons/objects/situations/semantic labeling of the scenes/video sequences; the old robot then returns the label to the new robot—all as shown in FIG. 1.

and/or robot learning mode d—transfer e.g. copying of rules from old robot to new; robot then uses old robot's rules for performing the new robot's tasks, perhaps unless over-ridden (e.g. by humans or by subsequent experience) or deduced by the robot to be unsuitable.

It is appreciated that any or all of the learning modes may be employed in any suitable combination. For example, a robot may be configured to inherit knowledge from a predecessor by employing mode a for object/person recognition, mode b for voice recognition and mode d for transfer of task knowledge e.g. scheduling and other cleaning rules.

According to certain embodiments, each robot also has one or more teaching modes, which may correspond to the learning modes above. A new robot may learn from an old robot using mode a (say), if the new robot has learning mode a and the teaching robot has teaching mode a.

Mode b is now described in detail. The old robot may transfer dataset/s of labeled "ground truth" examples as learned by the old robot on location not remotely e.g. in the factory, to the new robot. Such a labelled dataset may for example include photos and/or videos of family members residing in a home in which both old and new robots operate, in various clothes, poses, environments, activities, and illuminations, where each photo/video is labeled with the name of the relevant family member. This allows the new robot a head start in recognizing the family members in the home in which the new robot is to operate.

Such a dataset may for example include multiple photos and/or videos of each of various household articles which need to be recognized by the robot where each photo/video is labeled with the name of the relevant article. For example, a robot for collecting dishes and loading them into the dishwasher may need to recognize different categories of dishes such as "best china" which the family members want to be handled in certain ways, and a robot for collecting clothes and loading them into the washing machine may need to recognize different categories of clothing such as "Jimmy's Little League uniform" which the family members want to be handled in certain ways.

It is appreciated that the new robot having received a "ground truth" dataset can train on that dataset, thereby to generate a trained neural network suitable to the new robot's work demands. Receiving ground truth examples from the old robot operating in a particular location allows an entire set or sequence of descendant robots operating in the same location to train themselves relying on examples labeled long ago by humans for the benefit of the old robot.

Still another example of labelled data that the new robot may receive from an old robot is a map of the house in which the old robot has operated and the new robot is to operate, with rooms labelled.

Navigation rules can be represented in the form of a labelled or marked map, which is marked to indicate which rooms and places are to be visited e.g. cleaned, and which should not be visited e.g. cleaned. The marks may also indicate time specificity—which room to clean (or not) at what hours and on what days. More generally, the new robot may receive and subsequently operate by rules programmed into the old robot e.g. by human users rather than being exclusively and exhaustively newly programmed by human users.

A new rule which was not programmed into the old robot e.g. "clean Jack's room every Wednesday" may be programmed into the new robot. The old robot's rules, which may have been copied e.g. using robot learning mode d described above, may have included just:

1. Clean Rooms A, C, D shown and marked on the house map on Mondays from 10:00 am; Clean room B, E on Tuesdays from 14:00; Do not clean room F.
2. Do not clean any room from 16:00 till 10:00;
3. Disable the house alarm after any family member comes in;
4. Enable house alarm after last family member leaves house;
5. If house alarm is activated in room X, go to room X make a video and send to the predefined family member(s)

Still, the new robot benefits by being able to operate in accordance with this rule without relying on human efforts to generate (re-generate) labelled data enabling the new robot to recognize "Jack's room" on the map provided by the old robot.

Mode a may also be used to facilitate operation of the new robot by rules which the new robot may learn from the old robot rather than just by rules newly programmed by human users. For example, using mode a, receipt by the new robot of a new rule such as "clean Jack's room every Wednesday"; may cause the new robot striving to operate in accordance with this rule to send various room images that the new robot has captured in each room the new robot has identified, to the old robot for labeling as "Jack's room" "kitchen" "bathroom" "mom's room" etc.

Any suitable logic may be provided e.g. in a processor in the robot, to implement system-selectability of learning modes a-c above. Typically, learning mode a would be prioritized, whenever practical, over learning mode b, and learning mode b would be prioritized, whenever practical, over learning mode c. For example, if the processors of the old robot store machine learning models which are compatible for execution by the new robot, the models may be copied rather than copying training sets or other databases available on the old robot. However, if the processors of the old robot store machine learning models which are not compatible for execution by the new robot, copying the models would not be effective and therefore training sets or other databases available on the old robot may be copied (transferred).

It is appreciated that machine learning models are usually smaller (hundreds of megabytes to a few Gigabytes) than machine learning training sets (e.g. upward of dozens of Gigabytes). While a database associated with the old robot may contain more detailed knowledge than the trained model stored on the old robot, that database is not necessarily stored on the old robot (e.g. because due to its size the database may be expensive to store) whereas the trained model is frequently stored on the old robot. Even if the database is stored on the old robot, transferring the database from old robot to new may require too much time e.g. 10 to 1000 times as long as merely transferring the model.

Object/human/situation recognition knowledge may be imparted from the old robot to the new, in the form of trained neural networks e.g. as per learning mode a above.

If a new robot "inherits" (copies) an entire trained neural network from its predecessor robot, then given input sensory data (e.g. from a video or 3D camera, or from a microphone) the new robot can use the trained neural network to generate output including a label of a recognized object which has been imaged, including its name and/or position, a semantic segmentation e.g. label per pixel of a sensed image, or a recognized speech or voice command which has been recorded by microphone.

Typically, learning mode c continues (training data continues to be sent from new robot to old) until a termination criterion is reached e.g. until performance of the new robot is as good as the performance of the old robot on the same task. For example, speech received by the microphone of the new robot may be digitized, and a copy of the digitized speech may be transferred to the old robot for recognition. The old robot recognizes the speech and sends the recognized text back to the new robot. In parallel, the same speech is processed and recognized on the new robot. The termination criterion may be that for n instances of speech, the new and old robots recognize the same text, say 99% of the time, or that the confidence level estimated by the voice command recognition software of the new robot reaches the confidence level estimated by the voice command recognition software of the old robot.

It is appreciated that a text command recognized by the old robot (and transferred to the new) may be s pronounced back to the user by the new robot, for confirmation. For example:
Human: Clean John's room now.
New robot: Should I clean John's room now?
Human: Yes.

It is appreciated that recognized text from the old robot and user confirmation/correction elicited by, say, the new robot, may be used both to train the new robot and to evaluate the performance of the new robot vs. old robot.

Similarly, speech received by the microphone of the new robot may be digitized, and a copy of the digitized speech may be transferred to the old robot for voice recognition purposes. The old robot recognizes the voice and sends the name of the speaker (a member of the family residing in the house e.g.) back to the new robot. In parallel the same speech is processed and recognized on the new robot. The termination criterion may be that for n consecutive instances of speech, the new and old robots recognize the same voice, say 99% of the time.

According to certain embodiments, each new robot may store in computer memory a list of items of knowledge that the robot would like to inherit from its predecessor/s. For each item on the list, the robot may store in computer memory whether or not this item of knowledge is available, from each of several or many robot models that may have served (or may still be serving) as the new robot's predecessor. For example, some robot models may have no teaching capability in which case no items of knowledge are available from them. Other robot models may have teaching capability but may have slightly different tasks than the new robot does, in which case, most items of knowledge are available from these models, but not all. Still other robot models may have teaching capability but may have markedly different tasks than the new robot does, in which case, a few items of knowledge can be usefully inherited from these models, but far from all.

Example: a new cleaning robot finds an old cleaning robot, with teaching capability, at its location, which is a city apartment. The new robot will "contact" the old robot and seek to transfer therefrom, some or all of the following: the map of the apartment; rules for cleaning in the form of maps, with semantic labeling of the names of the rooms and of objects within each room; time rules for cleaning; data sets representing appearances and voices of family members in video and audio form respectively, properties of objects within the apartment e.g. moveability (e.g. shoes, clothes, toys and chairs are movable, tables are less movable, sofas are even less movable, and book-cases fixed to the wall are not movable.

It is appreciated that any suitable language may be employed for semantic description such as Universal Robotic Description Format (URDF), Semantic Robot Description Language (SRDL), or languages described in "Towards Semantic Robot Description Languages" by Lars Kunze; IEEE Conf. On Robotics and Automation, 2011.

According to certain embodiments, a new robot may receive an update of a learning algorithm, which is intended to replace an old learning algorithm, e.g. from a manufacturing entity that has continued developing the robots. Software updates may be effected by any suitable technology e.g. via the Internet, or via WIFI, or via a cellular network.

When replacing an old learning algorithm with a new learning algorithm e.g. provide as an update, the new robot may continue running both learning algorithms in parallel for a certain period of time, including using the old algorithm to provide labelled data to train the new algorithm, until a termination criterion is reached at which point the old algorithm is finally discarded. The criterion may be that the performance of the new algorithm alone matches or exceeds the performance of both running together.

An example of robot-to-robot learning method according to certain embodiments of the invention is now described in detail. Some or all of the following operations, each typically performed by a suitably programmed processor or controlled by a suitably configured controller, may be provided, suitably ordered e.g. as follows:

Set-up operation oo which precedes robot learning: provide every new robot with a data repository storing, for each old robot model number, what are the old robot's "teaching capabilities" e.g. is the old robot model x capable of copying its learned data to the new robot, and/or is the old robot model x capable of copying its learning algorithms to the new robot, so that operation of the old robot's learning can be simulated by the new robot and/or is the old robot model x capable of accepting queries.

Operation 01. Establish communication e.g. WIFI or Bluetooth (say) connection between the two robots using any suitable technology. For example, Point-to-Point (P2P) Devices communicate by establishing "P2P Groups", using the handshake procedures for initiating connection defined in the Bluetooth; WIFI; or other wired or wireless communication protocols. Typically, handshaking begins when one device e.g. the new robot sends a message to another device e.g. the new robot's predecessor, indicating a desire to establish a communications channel between the robots. The two robots then send messages back and forth until a mutually satisfactory communications protocol has been agreed upon.

Any suitable protocol may be employed such as but not limited to WIFI Direct, aka WIFI P2P, which has the ability to connect devices even if they are from different manufacturers. It is appreciated that, at least for certain robot-to-robot protocols, a new robot may learn from an old legacy robot which is not itself pre-configured to teach successors. For example, given a pair of WIFI devices communicating via WIFI Direct, only one of the WIFI device pair need be compliant with WIFI Direct to establish a peer-to-peer connection that transfers data directly between the two devices. More generally, any protocol P that supports communication between a P-compliant device and a non-P-compliant device, may be used to allow a new robot to learn from an old legacy robot which is not itself pre-configured to teach successors. For example, a new robot can ask a human to input by hand the model number or unique identifier of an old robot which may not know its own model or unique identifier. The new robot can transfer to itself the entire memory contents of the old-robot using, say WIFI direct. Next, the new robot can consult pre-stored tables which represent the architecture and format of robot model x and its memory, and can, accordingly, differentiate between knowledge transferred from the old robot which is useful to the new robot, and knowledge transferred from the old robot which is not useful to the new robot hence can be deleted. The pre-stored TABLES may for example explicitly indicate that for an old robot of model x, certain portions of the old robot's memory are useful and may be employed for certain new robot functionalities (e.g. portion I stores knowledge e.g. model, rules or other data useful for object/person recognition, portion II stores knowledge e.g. model, rules or other data useful for voice recognition and portion III stores knowledge e.g. model, rules or other data useful for scheduling of the robot's tasks)—other portions of the old robot's memory are not useful and should not be copied or, if copied, should be deleted.

Operation 02. prompt human user to manually input the model of the old robot, unless the old robot knows its own model number Operation 03. If supported by old robot's model, ask old robot to send map of environment Operation 04. If supported by old robot's model, ask old robot to send time rules Operation 05. If supported by old robot's model, send names of persons and data set for each, e.g. to enable commands to be performed conditional on who issued them, or to enable operations to be performed conditional on who is present Operation 06. If supported by the old robot's model, send for each of one or more IR controlled smart home devices (e.g. air conditioner/TV set/audio center remotely controlled e.g. via an IR (infra-red) LED (light emitting diode) the device's particular e.g. interface. For example, the interface may include the exact LED flashing sequence which commands the device to change the temperature on the air conditioner, channel on the TV, sound track or volume on an audio center.

Operation 07. If supported by an old robot's model, send all the set of reminders For example, a talking alarm clock, when ringing at a certain time, may vocalize a reminder e.g. "Theatre at 20:00 today"—the reason for the alarm. The alarm clock may for example be connected to a calendar stored either locally e.g. on a household computer or on the cloud, e.g. in Google Calendar application.

Figure 2:
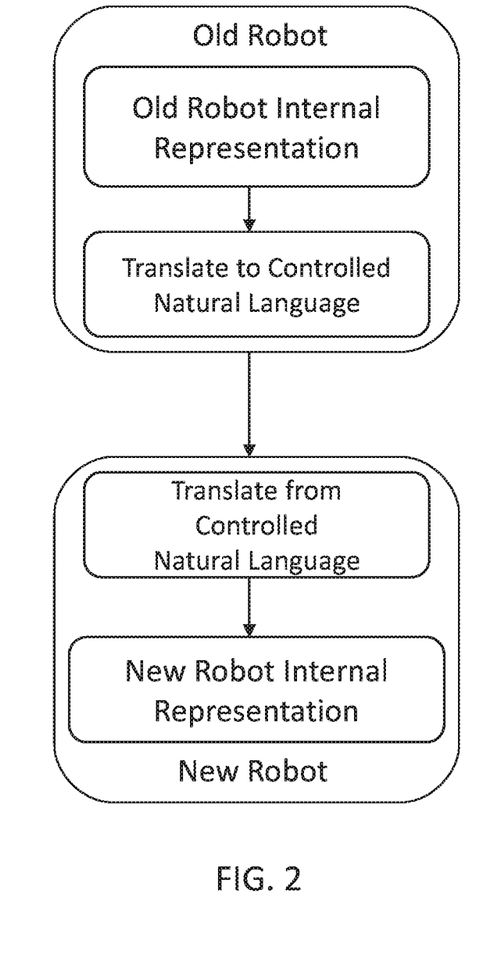
FIG. 2 is a diagram of an embodiment of the present invention which is useful for robots having different representations of knowledge and/or of rules.

FIG. 2 is a diagram of an embodiment of the present invention, typically performed by suitably programmed processor/s, which is useful for robots having different representations of knowledge and/or of rules. Different rules in different robots may have various internal descriptions, therefore rules and/or knowledge may be transferred between the robots by first translating to an intermediate syntax e.g. any suitable Controlled Natural Language from among those described in: "A survey and classification of controlled natural languages", Tobias Kuhn; JCL vol. 40/1, March 2014; pp. 121-170".

Figure 3:
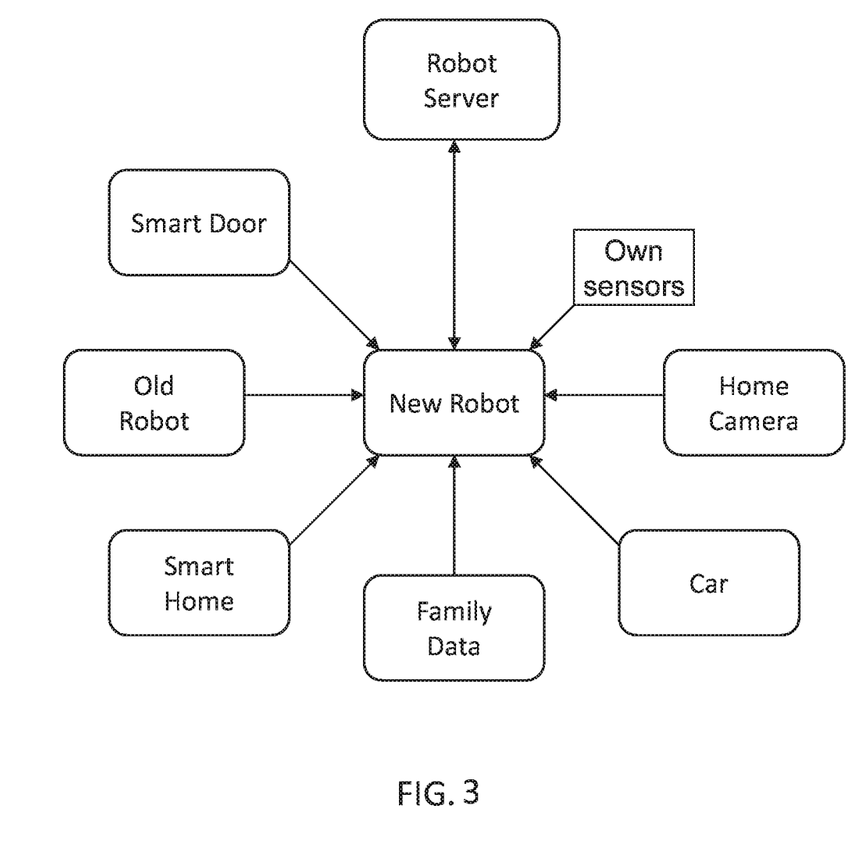
FIG. 3 is a diagram of an embodiment of the present invention in which a new robot receives knowledge from multiple sources, including but perhaps not limited to its predecessor.

FIG. 3 is a diagram of an embodiment of the present invention in which a New Robot's processor receives knowledge from multiple sources including but perhaps not limited to its predecessor. Then, the new robot may send a typification of the knowledge it has collected to a dedicated server (which may be remote, in which case all transmissionsmay be suitably encrypted and/or anonymized) and responsively, the server may provide the robot with appropriate models and software for dealing with the specific typification identified to the server by the new robot. For example, upon learning from the old robot that a squirrel or other pet is present in the home, the robot may transfer this information to the server, and responsively may receive instructions and data for taking care of squirrels.

Or, upon learning from the old robot that children of a certain age are present in the home, the robot may transfer this information to the server and responsively, may receive appropriate content e.g. songs, audiobooks, lessons, games.

Or, the new robot may collect 2 maps. The first map, inherited from its predecessor, marks the area where the old robot should clean. The other map is a 3D world model, which may have been scanned by the prior robot and, being 3D, allows clearance of each area to be determined. The new robot, being aware of the model of the old robot and hence of a difference between the old robot's clearance and the new robot's clearance, may deduce that areas marked as un-cleanable or un-passable on the first map may be cleaned without difficulty by the new robot which has lower clearance than its predecessor. The new robot may then seek human confirmation that these areas should in fact be cleaned henceforth and may then update the first "which areas to clean" map accordingly.

Or, the new robot, being aware of the model of the old robot and hence of a difference between the old robot's cleaning capabilities and the new robot's cleaning capabilities, may conjecture that all rules of the form "sweep room x at time y" inherited from the old robot, should be modified to "sweep and mop room x at time y" since the new robot can both sweep and mop, whereas the old robot could only sweep. The new robot may then seek human confirmation and may then update the relevant rules accordingly.

More generally, the new robot may systematically modify (with our without first obtaining human confirmation) knowledge obtained from its predecessor, using heuristics which predict suitable modifications given certain known differences between the new robot's properties and its predecessor's properties.

Any suitable procedure may be employed to enable a new robot to distinguish between its predecessor and other wireless devices deployed in the house or other environment. Generally, the handshaking procedure known in the prior art includes mutual identification between the handshaking devices, and exchange of device identification information. The new and old robots, apart from identifying themselves, may exchange their respective models and/or types and/or unique identifiers and/or software/hardware configurations, as appropriately pre-programmed for further cooperation.

Any suitable network security procedure, including password protection and/or encryption, may be employed to ensure that a new robot properly recognizes its predecessor as opposed to, say, a neighbor's cleaning robot. For example, each robot may be configured to transfer data toward another robot only upon receiving an access password therefrom, and the neighbors' access passwords are not known, whereas "self" access passwords are known e.g. common to all robots belonging to a given human individual or family, or enterprise, or organization.

It is appreciated that passwords need not be employed, since, optionally, a robot or other device to be trusted may be identified by its location alone. For example, the boundaries of the environment (of the room or house or property or other premises) are known or discovered (e.g. by the human or by wall-finding). Then, any other robot within those boundaries is assumed to be a robot which can be learned from and any robot not within those boundaries is assumed, absent independent confirmation, not to be a robot which can be learned from.

If desired, a new robot may seek human confirmation before learning from old robots identified by location alone. For example a new robot may scan a house, find an old robot in some room of the house, wait for a trusted authority e.g. family member to come, and then say "is this robot ok for me to learn from?". Or, the new robot may image an old robot found in one of the rooms of the house that has been defined as its environment, then say to a family member: "I found this robot on Tuesday morning in Jim's room. Ok for me to learn from him, or not ok, or ask again later"?

It is appreciated that passwords, if employed, may be assigned by a trusted authority and any suitable technology may be employed to recognize a trusted authority e.g. by artificial vision or by voice recognition. Optionally, a first robot administrator e.g. trusted authority, can add additional administrators e.g. by voice command.

It is appreciated that certain embodiments herein are, for many use-cases, advantageous over, say, a robot governed by a remote (e.g. on-cloud) server which may transfer its knowledge, via the remote server, to a new robot. For example, on-cloud processing is often inefficient for video applications. Also, users often do not like to transfer their home environment, video, and private information to a cloud.

It is appreciated that certain embodiments herein are, for many use-cases, advantageous over, say, manually transferring an old robot's processor into a new robot (e.g. as SIMs are transferred from an old cellphone to a new one). For one thing, moving the processor typically requires hardware compatibility that is a severe engineering constraint even for consecutive robot models from a single manufacturer. In contrast, provision of a protocol for exchanging data stored in the processor between robots, can support data exchange e.g. data copying between robots of different models/manufacturers.

Typically, a new robot is not designed to employ the typically less powerful, previous generation processor employed by the new robot's predecessor. Also, the CPU may not be swappable CPU, or access to the CPU may be difficult or impossible e.g. due to performance/size/weight/cooling/data speed/cost considerations. Also, a new robot may have different hardware for different tasks, or upgraded hardware for the same tasks, and the new-robot's processor may then have software functionality for interacting with this new hardware, which the old-robot's processor does not have. Also, human users may not have the proficiency or desire to effect manual transfer of a processor (or memory) from one robot to another.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer usable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices, such as smartphones, may be operatively associated with, but external to, the cloud.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly, although not limited to, those described in the Background section or in publications mentioned therein.

Conversely, features of the invention, including operations, which are described for brevity in the context of a single embodiment or in a certain order may be provided separately or in any suitable sub-combination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. An advanced robotic system, referred to a new robot, including a computer-controlled actuator with sensors which is operative for performing at least one task in an environment, the system comprising:
    a short-range wireless receiver in said robotic system;
    a learn-from-predecessor functionality including a processor which is governed by a data exchange protocol,
    said processor is configured to control short-range wireless knowledge transfer from a short-range wireless transmitter in a predecessor robot system, referred to an old robot, to the short-range wireless receiver,
    wherein the wireless knowledge transfer comprises copying from the old robot into the new robot at least one environment-specific datum, the datum comprises trained machine-learning models, labeled data and rules for performing the at least one robot task; and
    wherein the new robot is configured to use the copied machine-learning models and labeled data, for deducing updated rules for performing the at least one robot task,
    wherein the new robot is configured to use the copied machine-learning models, labeled data and capabilities different from capabilities of the old robot for deducing updated rules for performing the at least one robot task, wherein the updated rules include the different capabilities of the new robot, the updated rules include modified scope of the task performable by the new robot, the modified scope comprises one or more extensions of the at least one robot task with user confirmation that the new robot can perform while the old robot cannot, wherein the new robot configured to perform said modified scope and update rules and map area to be cleaned.

2. A system according to claim 1 which is also operative for searching the environment for at least one robot still deployed in the environment, to serve as the predecessor robot.

3. W A system according to claim 2 wherein said task is performed differentially, in the presence of different humans.

4. A system according to claim 1 wherein said datum learned from the predecessor robot comprises at least one spatial attribute of the environment's physical layout and wherein said task comprises cruising at least a predefined portion of said layout.

5. A system according to claim 1 wherein said at least one environment-specific datum comprises at least one trained model.

6. A system according to claim 1 wherein said at least one environment-specific datum comprises labeled data.

7. A system according to claim 1 wherein said at least one environment-specific datum comprises at least one rule governing at least one robot task.

8. A system according to claim 1 wherein said datum comprises an if-then rule programmed into the predecessor robot by a human or learned by the predecessor robot from its own predecessor or from its own experience in the environment.

9. A system according to claim 8 wherein said if-then rule has the form: if condition on detected location of recognized mobile entity-human/pet or on time or environment attribute is met, then at least one task parameter is defined.

10. A system according to claim 1 wherein said datum learned from the predecessor robot comprises at least one face of at least one human who has, to date, frequented said environment.

11. A system according to claim 1 wherein said learn-from-predecessor functionality is operative to transfer predetermined sensitive information only via a wired connection by using USB or Ethernet cable.

12. A system according to claim 1 wherein the robots communicate using a direct Point-to-Point Protocol.

13. A system according to claim 1 wherein the robots communicate via a WIFI router.

14. A system according to claim 1 wherein the old robot sends its model number to the new robot upon request, and the new robot stores in computer memory a list of old robot models including at least one data item relevant to between-robot knowledge transfer, for each model on the list.

15. A system according to claim 14 wherein said data item includes a learning mode which the new robot should select, when learning from the old robot.

16. A system according to claim 1 wherein the new robot updates at least one of the old robot's firmware and the old robot's software, thereby to transfer knowledge to the old robot.

17. A system according to claim 1 wherein said at least one datum comprises a labelled dataset of human family member images, for a human family residing in the environment.

18. A system according to claim 1 wherein the system also includes teach-successor functionality governed by a data exchange protocol, known to the system and to a successor robot system, which controls short-range wireless knowledge transfer from a short-range wireless transmitter in the system to a short-range wireless receiver in said successor robot, said knowledge comprising at least one environment-specific datum stored in computer memory in the system.

19. A system according to claim 1, wherein the modified scope includes modified map regions in which the task is performable by the new robot.

* * * * *